J. J. MAHONEY & W. L. NORRIS.
PIPE LAYING MACHINE.
APPLICATION FILED MAY 7, 1913.

1,143,844.

Patented June 22, 1915.
5 SHEETS—SHEET 1.

Fig. 1.

WITNESSES:

INVENTORS
John J. Mahoney and
William L. Norris;
BY G. H. Shong.
ATTORNEY

UNITED STATES PATENT OFFICE.

JOHN J. MAHONEY, OF SAN FRANCISCO, AND WILLIAM L. NORRIS, OF BERKELEY, CALIFORNIA, ASSIGNORS TO CALIFORNIA PIPE LINE MACHINE CO., OF SAN FRANCISCO, CALIFORNIA, A CORPORATION OF CALIFORNIA.

PIPE-LAYING MACHINE.

1,143,844.      Specification of Letters Patent.     Patented June 22, 1915.

Application filed May 7, 1913. Serial No. 766,056.

*To all whom it may concern:*

Be it known that we, JOHN J. MAHONEY, of the city and county of San Francisco, State of California, and WILLIAM L. NORRIS, of Berkeley, county of Alameda, State of California, citizens of the United States, have invented new and useful Improvements in Pipe-Laying Machines, of which the following is a specification.

This invention relates to a pipe laying and screwing machine.

It is the object of this invention to provide a machine for connecting and laying pipe to form pipe lines for conveying water, oil and other fluids, and for disconnecting and taking up such pipe lines.

Another object is to provide a pipe laying machine which is particularly adapted for handling and connecting screw threaded pipes of considerable weight and of large length and diameter, and by means of which the line of pipe may be quickly and cheaply laid.

A further object is to provide a pipe laying machine which is so constructed as to travel upon the connected sections of pipe, thus facilitating laying of the pipe across rough and uneven ground, marshy land, creeks, gulleys, ditches and over obstacles; the pipe thus forming a track on which the machine travels in moving from one section to another.

Among other objects, which will be hereinafter set forth, is the provision of a means for raising and lowering the machine and pipe in relation to the ground by a power plant carried by the machine, means for locking the machine and pipe on which it is supported together to prevent turning of the latter, and means for rotating a section of pipe by motor power to connect it in screwed engagement with the end of a subsequently laid section, which means is adapted to cushion the application of power thereto, equalize strains, compensate for the advancing or retracting of the added pipe as the threads screw in or out, and operate indicating means by which the operator can determine when the pipe has been set up and is sufficiently tight.

The invention resides in a carriage adapted to travel on a pipe as on a track, and means for picking up and screwing a section of pipe to the section on which the carriage is mounted or removing it therefrom.

The invention further consists of the parts and the construction and combination of parts as hereinafter more fully described and claimed, having reference to the accompanying drawings, in which—

In the drawings, the frame or carriage body of the machine is indicated at 2, and is here shown as consisting of a tubular member adapted to surround the pipe to be laid. This carriage body 2 is preferably formed of a large diameter of pipe. The forward end of the carriage body 2 extends through and is secured to a channel plate 3, and is provided with similar channel plates 4 throughout its length to form suitable supports for the bearings of various mechanisms to be hereinafter described.

Revolubly mounted on a bushing 5, secured to the forward end of the carriage 2, is a toothed wheel 6, which wheel is adapted to be rotated by means of a pinion 7, carried on a short shaft 8, journaled in suitable bearings. The shaft 8 carries a pair of spaced toothed wheels 9 and 9', which are adapted to be engaged by toothed wheels 10 and 10' of different diameters, mounted to move longitudinally on a countershaft 11 and revoluble therewith. The toothed wheels 10 and 10' are adapted to be shifted by means of a hand lever 11' to throw the toothed wheel 10 into engagement with the toothed wheel 9, the toothed wheel 10' into engagement with the toothed wheel 9', or dispose the toothed wheels 10 and 10' between the toothed wheels 9 and 9' out of engagement therewith.

The toothed wheels 9 and 10 and 9' and 10' are of different diameters in relation to each other for the purpose of varying the speed of rotation of the shaft 8, and consequently the pinion 7 and toothed wheel 6 in relation to the countershaft 11, as is common in change speed mechanism. The countershaft 11 extends parallel with the carriage 2 and is revolubly mounted in suitable bearings carried by the channel plates 3 and 4. A toothed wheel 12 is mounted on the countershaft 11 and is adapted to be engaged by either one of two pinions 13 and 13'.

The pinion 13 is slidably mounted on the squared portion of a shaft 14, on which is mounted a friction disk 15, adapted to be thrown in and out of engagement with the fly-wheel 16 on the drive shaft of a suitable engine or motor 17, mounted on the carriage 2. The pinion 13' is an idler and is loosely mounted on a stud shaft 18 and is in constant mesh with the pinion 13. The pinions 13 and 13' are designed to slide lengthwise on their respective shafts 14 and 18 and are adapted to be thrown alternately in and out of engagement with the toothed wheel 12 to rotate the latter and the shaft 11 when the shaft 14 is connected with the engine shaft through the clutch 15 and fly-wheel 16.

Figures 2, 8, 9:
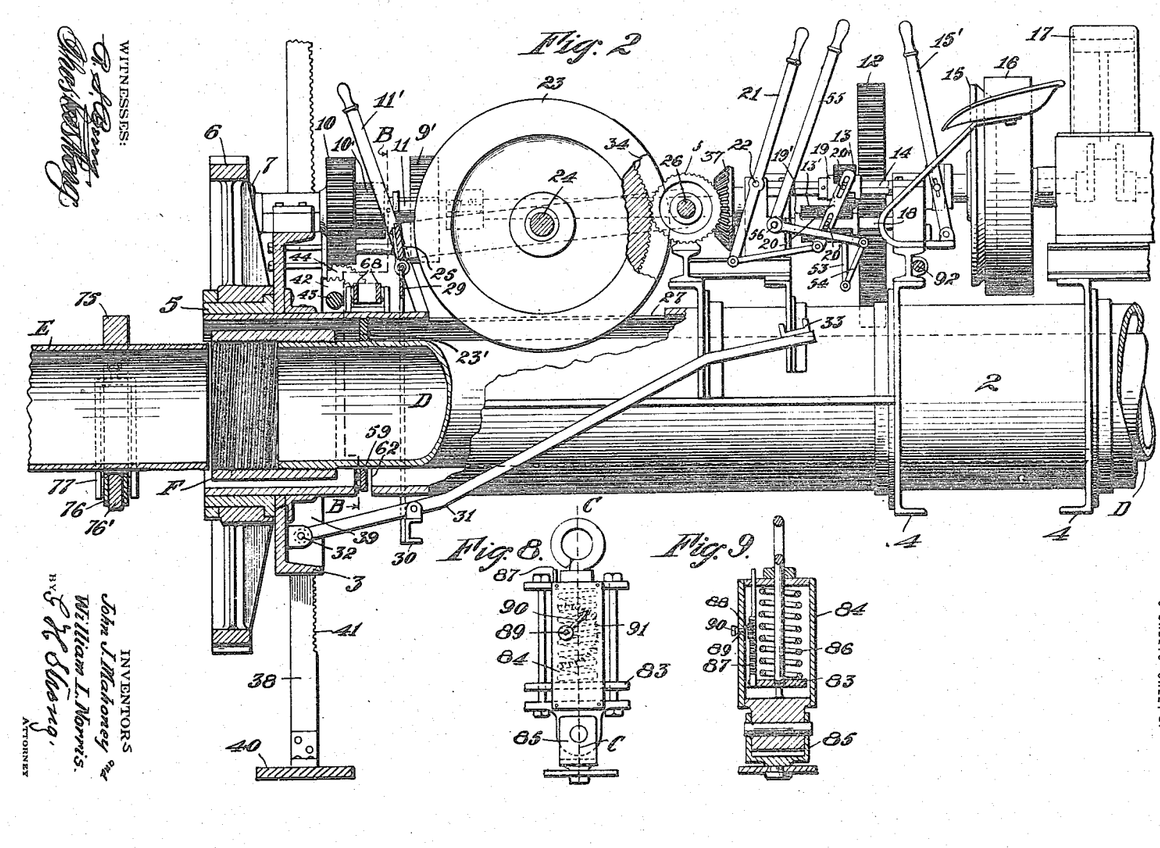
Fig. 2 is a view in elevation from the side of the machine opposite to that shown in Fig. 1, with parts broken away and partly in vertical section.
Fig. 8 is a detail in elevation of the expansible and contractible pipe clamp carrying device.
Fig. 9 is a vertical section on the line C—C of Fig. 8.

The means for shifting the pinions 13 and 13' is here shown as consisting of yokes 19 and 19', which are slidably mounted on the shafts 14 and 18 and extend on the opposite sides of the pinions 13 and 13'. The yokes 19 and 19' are connected together by means of a link 20 which is slotted longitudinally to receive pins 20' carried by the yokes 19 and 19'. The lower end of the link 20 is connected to a hand lever 21, fulcrumed at 22, in such a manner that when the hand lever 21 is rocked, the link 20 will operate to move the pinion 13 in one direction and the pinion 13' in the opposite direction. The pinions 13 and 13' have a limited movement on their respective shafts 14 and 18, and are so arranged and positioned, in relation to each other, that when disposed in an intermediate position, as shown in Fig. 2, the pinions 13 and 13' will be out of engagement with the gear 12. By shifting the hand lever 21 to the right the pinion 13 will be thrown into mesh with the toothed wheel 12 to drive the latter directly from the shaft 14, and when the hand lever 21 is thrown to the extreme position to the left, the pinion 13 will be moved out of mesh with the toothed wheel 12 and the pinion 13 will be thrown into mesh with the toothed wheel 12, so that the latter will be rotated indirectly from the shaft 14 through the pinions 13 and 13'; the pinion 13' being of such width as to be engaged by the pinion 13 when the latter is in its outermost position.

By the operation of the hand lever 21 to shift the pinions 13 and 13', as just described, the direction of rotation of the toothed wheel 12, countershaft 11, the toothed wheels 10 and 10', 9 and 9', pinion 7, and the toothed wheel 6 may be varied as desired and rotated by means of the engine 17 through the clutch 15 and shaft 14.

The carriage 2 is designed to travel and be propelled in either direction on the pipe line for constructing which this machine is designed. For this purpose a tractor wheel 23 is provided, adjacent the forward end of the machine, which tractor wheel is revolubly mounted on a shaft 24, carried by a yoke 25, pivotally mounted on a shaft 26, journaled in suitable bearings on the carriage 2. The tractor wheel 23 is formed with outwardly flared flanges on its sides and extends through an opening 27 in the carriage frame 2 so as to contact and ride upon the pipe D, as is particularly shown in Fig. 2; the flanges on the tractor 23 bearing on the pipe D on each side of its vertical center.

Figure 1:
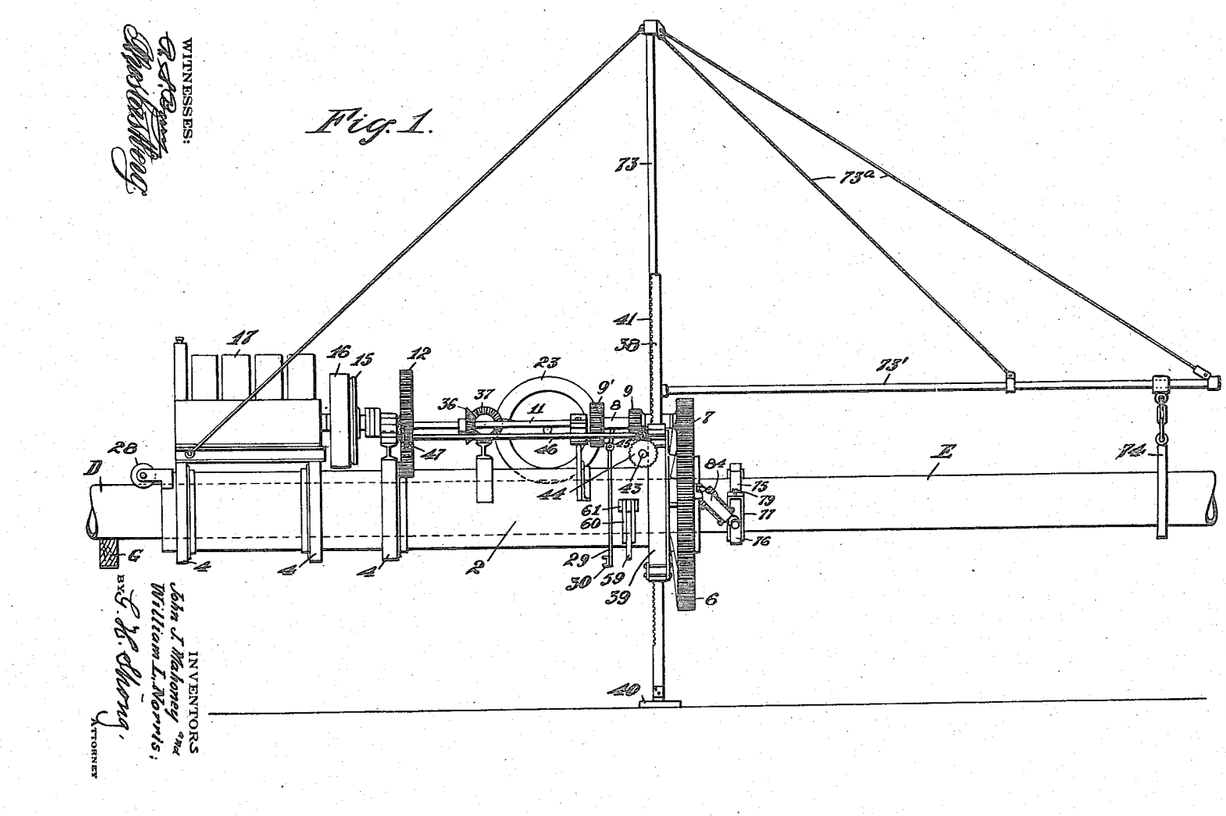
Figure 1 is a side elevation of the invention.

A pair of trailing wheels 28, adapted to travel on the pipe D, are provided at the rear end of the carriage to form a revoluble support for this end of the carriage on the pipe D, as shown in Fig. 1. The outer end of the yoke 25 connects with a yoke 29, which yoke 29 is disposed astride of the carriage frame 2 and has a horizontally extending cross-bar 30 mounted on its lower ends a short distance below the underside of the carriage frame 2. The cross-bar 30 is connected to a foot lever 31, pivoted at 32 on the channel plate 3, the upper portion of which lever extends upwardly alongside of the carriage body 2 and has a foot rest 33 on its upper end. The foot lever 31 is adapted to be depressed by the weight of the operator to throw the tractor wheel 23 into operative engagement with the pipe D. The downward pressure on the outer end of the lever 31 acts to move the tractor wheel 23 downward against the pipe D and to move the forward end of the carriage body 2 in an upward direction after the tractor 23 contacts the pipe D, thus throwing the weight of the forward end of the carriage body 2 onto the tractor and thereby frictionally engaging the tractor 23 and pipe D.

The tractor wheel 23 is provided with gear teeth 34 upon its periphery, between the divergent flanges thereon, which gear teeth are normally engaged by a pinion 35 keyed on the shaft 26. The shaft 26 is provided with a beveled pinion 36 which meshes with a corresponding pinion 37, mounted on the countershaft 11 in such a manner that when the countershaft 11 is rotated the tractor wheel 23 will be rotated therewith.

Means are provided for supporting the outer end of the carriage body 2 independent of the pipe line D, and by means of which the carriage body 2 may be held securely against movement either longitudinally, laterally, or vertically. This means is here shown as consisting of a pair of vertical standards 38, which are slidably mounted in guides 39, carried by the channel plate 3. The lower ends of the standards 38 are connected together by means of a growler board 40. The growler board 40 is adapted to rest upon the ground and span a ditch or trench and form a level support for the standards when the ground is rough and uneven.

Formed on the standards 38 are rack teeth 41 which are engaged by pinions 42, mounted on a shaft 43, supported by suitable bearings on the channel plate 3. A worm-wheel 44 meshing with a worm-pinion 45 on a shaft 46 serves to lock the shaft 43, pinions 42 and the standards 38 against movement when the shaft 46 is not rotated. The shaft 46 is designed to be rotated in either direction from the toothed wheel 12 to rotate the shaft 43 and pinions 42, through the worm-pinion 45 and worm-wheel 44, and thereby cause the forward end of the carriage frame to move up and down on the standards 38.

Means are provided for gearing the shaft 46 to the toothed wheel 12 directly and indirectly and which is adapted to be thrown out of connection with the toothed wheel 12 when the machine is in a stationary position so as not to transmit motion to the shaft 46 from the toothed wheel 12. This means is here shown as consisting of a pinion 47, keyed on the shaft 46; a toothed wheel 48 meshing with pinion 47 and carried by rocker arms 49 pivoted on the shaft 46; and a pinion 50 meshing with the toothed wheel 48, and carried by arms 51 pivoted to rock on the axis of the toothed wheel 48. The arms 49 normally gravitate to a lowermost position against a stop 52, in which position the teeth of the wheel 48 will be out of mesh with the teeth of the wheel 12.

The arms 51, carrying the pinion 50, are connected to a lever 53 which extends inwardly over the carriage body 2 and is connected by a link 54 to a bell-crank lever 55, fulcrumed at 56 and adapted to be rocked by hand to throw the pinion 50 or the toothed wheel 48 in and out of engagement with the toothed wheel 12. The lever 55 normally gravitates on its fulcrum 56 to position the pinion 50 in mesh with the toothed wheel 12 and is held in an intermediate position in any desired manner to dispose the pinion 50 out of engagement with the toothed wheel 12.

A stop 58 is provided on the arm 49 to limit the rearward movement of the arms 51 in such a manner that when the lever 55 is rocked to the left to elevate the lever 53, the arms 51 will engage the stop 58 to cause the arm 49 to move in an upward direction and throw the toothed wheel 48 into engagement with the toothed wheel 12, so that when the latter is rotated a rotary motion will be transmitted from the wheel 12 through the wheel 48 and pinion 47, shaft 46, worm-pinion 45, worm-wheel 44, shaft 43, and pinion 42, to cause the latter to move in one direction on the racks 41 formed on the standards 38. By throwing the hand lever 55 to the extreme right, the lever 53 will be moved downward to position the pinion 50 in engagement with the toothed wheel 12, so as to transmit a rotary motion to the pinions 42 through the pinion 50 and toothed wheel 48, etc., to move the pinions 42 in a reversed direction on the standards 38.

Means are provided for clamping or locking the carriage frame 2 to the pipe D so as to prevent rotation of the latter and also to secure the carriage body 2 against longitudinal movement. This means is particularly illustrated in Figs. 6 and 7, and consists of a curved arm 59 carrying gripping teeth 59', pivotally attached at one end to a link 60, pivoted at 61 to one side of the carriage body 2; the arm 59 being adapted to extend through a circumferential slot 62. The slot 62 is formed on the underside of the carriage body to position the teeth 59' on the concave upper edge of the curved arm in engagement with the underside of the pipe D. The outer end of the arm 59 extends through a link 63 and is held in engagement therewith by means of a pin 64 carried on the outer end of the arm 59. The upper end of the link 63 is pivotally connected by a pin 65 to a slotted link 66 pivoted on a stud 67 on the carriage body 2, and the upper end of the link 66 is adapted to extend into a slotted arm 68 pivoted at 69 to the carriage body 2; the upper end of the link 66 being designed to be disposed rearward of a block 70 which is reciprocally mounted in the slotted arm 68. The pivot pin 65, connecting the link 63 and the link 66, extends on opposite sides of the latter in such a manner as to engage the underside of the slotted arm 68 to support the arm on the link 66.

Figure 6:
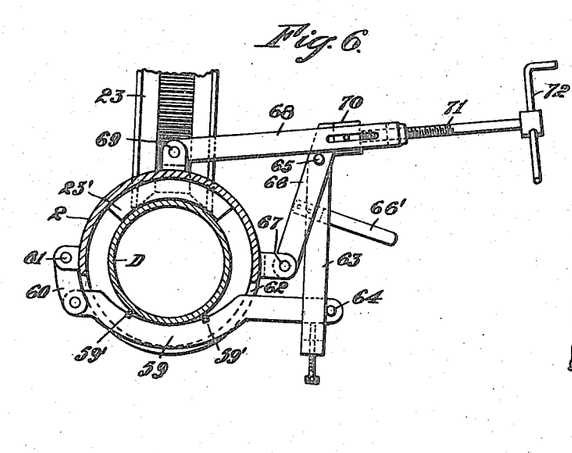
Fig. 6 is a detail section on the line B—B of Fig. 2, showing the mechanism for clamping the machine to the pipe line.
Figure 7:
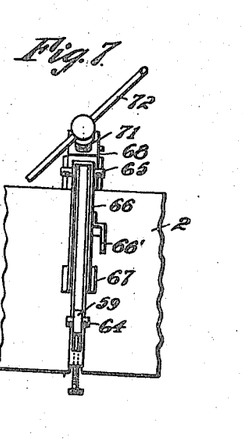
Fig. 7 is a detail in side elevation of same.

Mounted in the outer end of the slotted arm 68 is a threaded shaft 71, provided with a handhold 72, by means of which the shaft 71 may be rotated in its threaded bearings to advance the block 70 against the upper end of the link 66 and move the latter in a rearward direction to exert an upward pull on the link 63 and the curved arm 59 to cause the latter to bear against the underside of the pipe D. The upward movement of the pipe D, when the curved arm 59 is pulled upwardly, is opposed by a downwardly extending flange 23' mounted on the interior of the carriage body 2. The arm 59 thus serves to clamp the pipe D against the flange 23' to hold the pipe against movement and also locks the carriage body 2 thereon; the teeth 59' acting to prevent turning of the pipe D in relation to the carriage 2.

Mounted on the channel plate 3, at the front end of the machine, is a mast 73, carrying a boom 73' which extends forward of the carriage body 2 and carries a pipe-engaging hook 74, adjacent to its outer end. The boom 73' is supported by stays 73ª connecting with the mast 73, which in turn is rigidly held by guys connecting with the carriage body at suitable points. This hook 74 is adapted to engage and support a length of pipe E which is to be connected to the pipe D.

Means are provided for gripping the pipe E, when supported on the hook 74, and connecting it to the toothed wheel 6, so that when the latter is rotated the threaded end of the pipe E may be screwed in or out of a coupling F on the outer end of the pipe D. The pipe gripping means is here shown, particularly in Figs. 3 and 4, as consisting of an arched arm 75, adapted to extend over the pipe E, and a curved gripping jaw 76 carried by the arched arm 75 adapted to extend under the pipe E, which arched arm 75 and jaw 76 are designed to be adjusted in relation to each other to clamp the pipe E against rotation therebetween.

Figure 4:
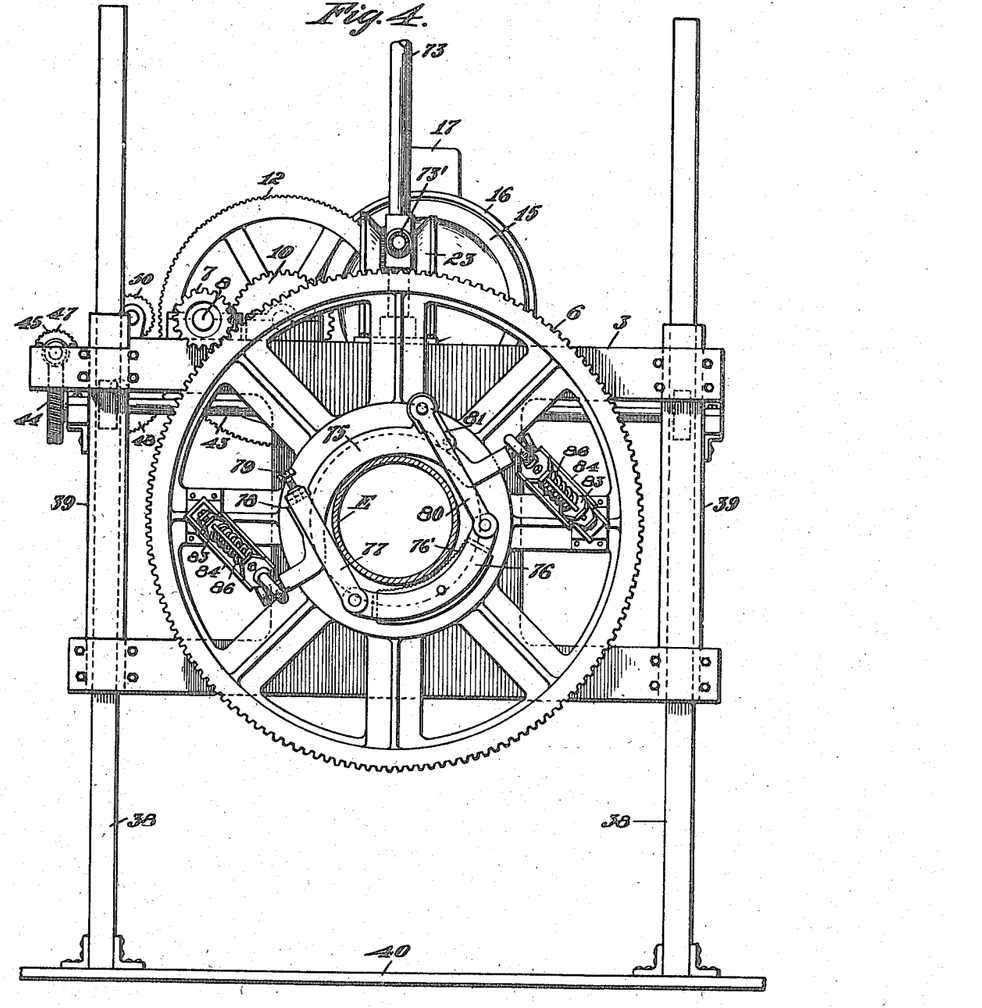
Fig. 4 is a front end elevation, with parts removed.

The connections between the jaw 76 and the arm 75 consist of a yoke 77 pivoted at one end to the jaw 76 and straddling a shoulder 78 on the arched arm 75, and an adjusting bolt 79 screwed in the outer end of the yoke 77 bearing against the shoulder 78. The bolt 79 is provided for the purpose of adjusting the position of the pivoted connection between the yoke 77 and the arched arm 75. The outer end of the gripping jaw 76 pivotally connects with a link 80, the upper end of which connects with a short link 81 pivoted on the arched arm 75; the links 80 and 81 forming a toggle which is adapted to be operated to move the arched arm 75 and the jaw 76 toward and away from each other. When the toggle is thrown inwardly beyond the center, as shown in Fig. 4, it serves to lock the jaw 76 against the pipe E so as to clamp the latter between the jaw and the arched arm. The arched arm 75 is connected at its ends to the toothed wheel 6; corresponding strain equalizers being interposed between the ends of the arched arm 75 and the toothed wheel 6 for the purpose of equalizing the strains on the gripping members and for cushioning the strains imposed upon the pipe E and gripping members when the toothed wheel 6 is rotated.

One of the strain equalizers is particularly shown in Figs. 8 and 9. It consists of a plunger 83 which is pivotally connected to the outer end of the arched arm 75, the plunger 83 being mounted in a frame 84, pivotally attached to a yoke 85 having a swiveled connection with the toothed wheel 6. A helical spring 86 is interposed between the plunger 83 and the frame 84 in such a manner as to oppose the outward movement of the plunger 83 and the frame 84 in relation to each other; the spring 86 forming a resilient or expansible and contractible connection between the gripping member and the toothed wheel 6.

Means are provided for indicating the strains imposed upon the gripping members 75 and 76, which means is controlled by the tension of the spring 86. This means is here shown as consisting of a toothed rack 87, carried by the plunger 83, for engaging a pinion 88 mounted on a shaft 89 journaled in the frame 84 and having an indicator or pointer 90 adapted to travel over a scale 91, which scale 91 is formed on the face of the frame 84. The scale 91 is graduated in pounds according to the tension of the spring 86, so that when the latter is compressed the strains imposed thereon will be indicated by the pointer 90 and the scale 91.

In the operation of this invention, the pipe D is introduced into the carriage body 2, with its outer end carrying the coupling F, disposed adjacent to the outer or forward end of the carriage body 2, as shown in Fig. 2, the pipe D being supported rearward of the carriage 2 on timbers G, or in any other suitable manner. The height of the carriage 2 is regulated to position it parallel with the pipe D, so that the outer end of the pipe D will be concentric with the toothed wheel 6. This vertical adjustment of the carriage is accomplished by operating the hand lever 55 to throw either the pinion 50 or the toothed wheel 48 into engagement with the toothed wheel 12, according to whether it is desired to move the carriage 2 in an upward or a downward direction. The rear end of the carriage 2 being supported on the pipe D, through the rollers 28, the latter will act as a fulcrum or center on which the carriage 2 will rock vertically, when being adjusted as just described, to the extent of movement permitted by the space between the outer end of the pipe D and the inner wall of the carriage 2.

It will be seen, when the carriage 2 is supported on the standards 38, that when the timbers G are removed the outer end of the pipe D will be supported by the carriage body 2.

This will permit of the pipe D being raised and lowered in unison with the carriage to dispose the carriage and the pipe on any desired plane. By removing the timbers or supports G, adjacent to the rear end of the carriage 2, the latter may be lowered sufficiently to bring the hook 74 in close proximity with the ground, where it may be engaged with a loose length of pipe E; the pipe D being of sufficient flexibility between the rear end of the carriage 2 and its supports G, which may be spaced as far rearward of the carriage as may be desired, to permit the downward movement of the forward end of the carriage 2 necessary to bring the hook 74 into engageable relation with the pipe E. When thus lowering the forward end of the machine the pipe D is freed from the clamp 59.

Figure 5:
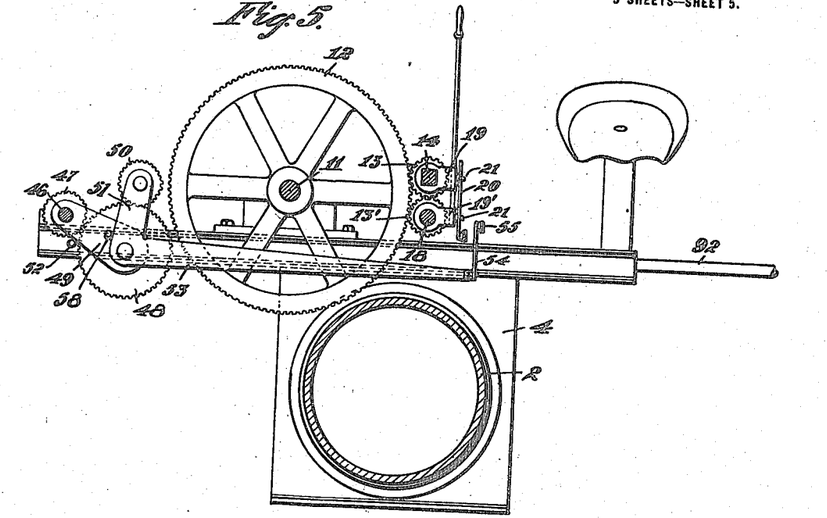
Fig. 5 is a detail section and elevation on the line A—A of Fig. 3.

After the hook 74 has been engaged with the pipe E, the carriage 2 is elevated, thereby lifting the pipe E clear of the ground and suspending it from the boom 73′ in alinement with the axis of the toothed wheel 6 and pipe D, the carriage 2 being raised to such a point as to dispose the open end of the pipe D concentric with the toothed wheel 6, as before described. When the proper vertical adjustment of the carriage 2 is obtained, the hand lever 55 is operated to throw the pinion 50 and toothed wheel 48 out of engagement with the toothed wheel 12, as shown in Fig. 5. This action disconnects the shaft 46 from the engine. The weight of the forward end of the machine will now be supported on the pinions 42 and standards 38. The pinions 42 and the shaft 43 on which they are mounted are held against rotation by reason of the worm-wheel 44 meshing with the worm-pinion 45.

Figure 3:
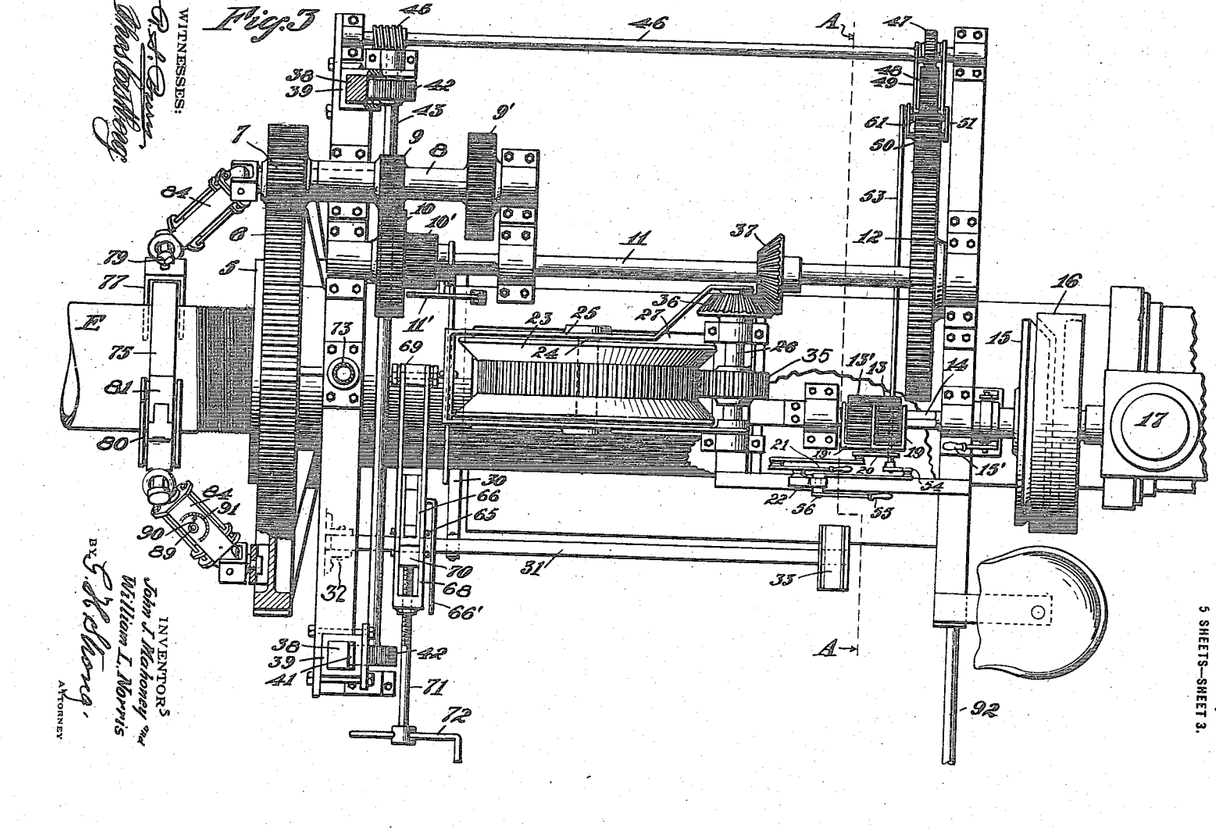
Fig. 3 is a plan view corresponding to Fig. 2, with portions broken away.

When the parts have been positioned as just described, the pipe D is clamped rigidly to the carriage 2 by means of the curved arm 59. The clamping members, consisting of the curved arm 75 and the jaw 76, are then placed over the pipe section E, rearward of the threaded outer end thereof, and are arranged some distance from the toothed wheel 6, as shown in Figs. 2 and 3. The pivotal connections of the plunger 83 and the frame 84 to the arm 75 and the toothed wheel 6 are such as to permit the clamping members being positioned a suitable distance from the outer face of the wheel 6. The arm 75 and the gripping jaw 76 are clamped on the pipe E by means of the toggle links 80 and 81 and the yoke 77 and the bolt 79, as before described, sufficiently tight to prevent the rotation of pipe E with relation to the clamping members 75 and 76. The clamping face of the jaw member 76 is formed of a block 76′ which is preferably toothed or serrated to increase its gripping power; the block 76′ being pivoted centrally to the jaw member 76 in such a manner as to tighten on the pipe E as the strain increases to prevent slipping of the jaw.

When the clamping members 75 and 76 are in position on the pipe E, the threaded end of the latter is disposed in position to enter the threaded coupling F on the pipe D. The pinion 10′, on the shaft 11, is then thrown into mesh with the pinion 9′ on the shaft 8; the pinions 10 and 10′ being previously disposed intermediate the pinions 9 and 9′ so as to be out of engagement with the latter when the shaft 11 is rotated through the gear 12 in adjusting the carriage 2 to its vertical position.

When the pinions 9′ and 10′ are intermeshed, the clutch 15, previously thrown out of engagement with the fly-wheel 16, is again operated so as to transmit motion from the engine shaft through the clutch 15, shaft 14, pinions 13 or 13′, toothed wheel 12, shaft 11, pinions 10′ and 9′, shaft 8, and pinion 7 to rotate the toothed wheel 6 in such a direction as to screw the threads on the pipe E into the coupling F on the pipe D. After the threads have been properly started, the pinion 10 may be thrown into engagement with the pinion 9, if desired, to increase the speed of rotation of the toothed wheel 6. The toothed wheel 6 in revolving causes the clamping members 75 and 76 to rotate therewith through the plungers 83 and the frames 84, the springs 86 bearing the strains transmitted from the toothed wheel 6 to the clamping members and pipe E. As the pipe E screws into the coupling F, the resistance to turning the pipe E is increased, thereby causing a correspondingly increased strain on the springs 86 through the medium of the plungers 83.

By determining what force or power is required to set the threaded end of the pipe E into the coupling F, it is possible to determine, through the indicator 90 and the graduations 91, when the pipe E has been screwed sufficiently far into the coupling F to make a tight joint. The movement of the plunger 83 on the compression of the spring 86 causes the rack 87 to rotate the pinion 88 and pointer 90 to indicate on the graduations 91 the extent of the strain imposed on and resisted by the spring 86. When the pipe E has been sufficiently screwed into the coupling F, the toothed wheel 6 is thrown out of operation by manipulating the clutch-operating lever 15′ or shifting the pinions 10 and 10′, or the pinions 13 and 13′, into their inoperative positions to stop the rotation of the wheel 6. Where it is desired to bury the threads of the pipe E in the coupling F, it is only necessary to watch the advance of the pipe E into the coupling F until the threads disappear. The provision of the springs 86, between the plungers 83 and the frame 84, perform an important function, in that the pipe E and the clamping members thereon may move inwardly and outwardly, with relation to the toothed wheel 6, as the pipe E is advanced or retracted in the coupling F.

When the pipe E has been set in position, the clamping members 75 and 76 are released therefrom and the clamping member 59 is disengaged from the pipe D by loosening the screw shaft 71 and the arm 68 allowing the links 63 and 66 to drop downwardly with the arm 59 to clear the pipe D. Timbers or blocks, not shown, are then placed beneath the pipe E at a suitable distance from the carriage 2 so as to support the pipe E, and the timbers G are placed under the pipe D adjacent to the rear end of the carriage 2. The pinions 42, engaging with the racks 41 on the standards 38, are then caused to revolve, as before described, in such a direction as to move the standards 38 in an upward direction and thereby leave the carriage 2 supported upon the pipe D. The forward end of the carriage 2 moves downwardly into contact with the pipe D before the standards 38 begin to move upwardly.

When the standards 38 have moved sufficiently far so that the growler board 40 will clear any obstacles that may be in front thereof, and the pinions 43 are thrown out of operation, the operator throws his weight on the lever 31 to depress the latter and thereby exerts a downward pull on the tractor 23 through the medium of the yokes 25—29 and the bar 30. The downward pressure on the outer end of the lever also acts to lift the forward end of the carriage 2 clear of the pipe D, when the latter is brought into contact with the tractor 23 on the downward movement thereof.

By throwing in the clutch 15 motion will be transmitted to the shaft 11 through the gear 12, as before described, and from thence through the pinions 36—37, shaft 26, and pinion 35, to the tractor 23, thus rotating the latter to cause the carriage to travel forward from the pipe D onto the pipe E any suitable distance. When it is desired to bring the carriage to a stop, the operator throws out the clutch 15, and if it is necessary to brake the carriage against further movement, such as may be occasioned by momentum or inclination of the pipe D, the lever 31 is released to cause the outer end of the carriage 2 to come into frictional engagement with the pipe E. By operating the pinions 13—13', the direction of rotation of the tractor 23 may be reversed as desired so that the carriage 2 may be propelled in either direction on the pipe D or E.

As a means for preventing the machine from tipping from side to side, when moving from one point to another on the pipe line, an outrigger 92 is provided, which outrigger is designed to be supported in any suitable manner and held against vertical movement as the carriage 2 moves backward or forward on the pipe. In practice the outrigger 92 is held manually; the various elements of the apparatus being so disposed in relation to the axial line of the carriage 2 as to be approximately balanced on each side so that the machine may be maintained in equilibrium on the pipe D by manipulating the outrigger 92 by hand.

When the apparatus has been moved to the forward end of the pipe E, the standards 38 are moved downward to position the growler board 40 on the ground, as before described, whereupon another loose section pipe E is picked up and the level of the carriage 2 adjusted in readiness for another pipe screwing operation, as before described.

By constructing the apparatus so as to adapt it to travel on a pipe, it is rendered possible to lay pipe lines over uneven surfaces, and by providing the adjustable standards 38 so arranged as to span a ditch or trench, the pipe line may be laid and lowered into a ditch when occasion so requires.

Having thus described our invention what we claim and desire to secure by Letters Patent is:—

1. In a machine for connecting pipes and the like, a carriage movably mountable on a laid pipe, driving means on the carriage, means actuated by said driving means for connecting a second pipe to the first pipe, means for moving the carriage to enable alinement of the pipes, and means actuated by the driving means to progressively move the carriage from one pipe to another as same are connected so as to be positioned ready for connecting a new pipe to the last connected pipe.

2. In a pipe screwing machine, the combination of a carriage adapted to be movably mounted on a horizontal pipe, a motor mounted on said carriage, means for propelling said carriage horizontally on the pipe by said motor, means for moving the carriage vertically, revoluble pipe gripping means on said carriage, and means for rotating said pipe gripping means by said motor.

3. In a pipe screwing machine, the combination of a carriage adapted to be movably mounted on a horizontal pipe, a motor mounted on said carriage, means for propelling said carriage horizontally on the pipe by said motor, means for moving the carriage vertically, revoluble pipe gripping means on said carriage, means for rotating said pipe gripping means by said motor, and gripping means for locking the carriage and a pipe together.

4. In a pipe screwing machine, the combination of a carriage adapted to be movably mounted on a pipe line as on a track, a motor mounted on said carriage, means for propelling said carriage by said motor, revoluble pipe gripping means on said carriage, means for rotating said pipe gripping means by said motor, adjustable supporting legs on said carriage, and means for operating said legs by said motor.

5. In a pipe screwing machine, the combination of a carriage adapted to be movably mounted on a pipe line as on a track, a motor mounted on said carriage, means for propelling said carriage by said motor, revoluble pipe gripping means on said carriage, means for rotating said pipe gripping means by said motor, adjustable supporting legs on said carriage, means for operating said legs by said motor, and means on said carriage for suspending a pipe in horizontal relation thereto.

6. In a pipe screwing machine, the combination of a carriage adapted to be movably mounted on a pipe line as on a track, a motor mounted on said carriage, means for propelling said carriage by said motor, revoluble pipe gripping means on said carriage, means for rotating said pipe gripping means by said motor, adjustable supporting legs on said carriage, means for operating said legs by said motor, means on said carriage for suspending a pipe in horizontal relation thereto, and means on said carriage for attaching same to the pipe on which it is mounted.

7. In a pipe screwing machine, the combination of a carriage having a running gear adapted to travel on a pipe line as on a track, a gear wheel rotatable on the carriage, a motor mounted on said carriage, means for driving said running gear from said motor to propel the carriage in either direction, pipe gripping means mounted on said gear wheel, and means for rotating said gear wheel by the aforesaid motor.

8. In a machine for connecting pipes and the like, a carriage having means for mounting same on a pipe, operating means on the carriage, means actuated by said operating means for connecting a second pipe to the first pipe and means actuated by said operating means for moving the carriage onto the second pipe after same has been connected to the first pipe in position for connecting a third pipe to the second pipe.

9. In a machine for connecting pipes and the like, a carriage movably mountable on a laid pipe, means on the carriage to connect a second pipe to the first pipe, and means to actuate the carriage to progressively move same from one pipe to another as same are connected so as to be positioned ready for connecting a new pipe to the last connected pipe.

10. In a pipe screwing machine, a tubular carriage, rollers thereon adapted to travel on a cylindrical pipe extending through said tubular carriage, pipe screwing mechanism mounted on said carriage, means on said carriage for driving said pipe screwing mechanism by motive power, means for propelling said carriage on the pipe by motive power operating on one of the said rollers, and means for locking the carriage and pipe together.

11. In a pipe screwing machine, a tubular carriage, rollers thereon adapted to travel on a cylindrical pipe extending through said tubular carriage, pipe screwing mechanism mounted on said carriage, means on said carriage for driving said pipe screwing mechanism by motive power, means for propelling said carriage on the pipe by motive power operating on one of said rollers, means for locking the carriage and pipe together, and means for moving the carriage in a vertical direction.

12. In a pipe screwing machine, a carriage, a motor for propelling the carriage horizontally, means for raising and lowering the carriage, means for clamping the carriage to a pipe, and revoluble pipe gripping means on the carriage operable by the motor.

13. In a pipe screwing machine, a carriage, a motor for propelling the carriage horizontally, means for raising and lowering the carriage, means for clamping the carriage to a pipe, revoluble pipe gripping means on the carriage operable by the motor, and expansible connections between the gripping means and its source of rotation.

14. In a pipe screwing machine, a carriage, a motor for propelling the carriage horizontally, means for raising and lowering the carriage, means for clamping the carriage to a pipe, revoluble pipe gripping means on the carriage operable by the motor, expansible connections between the gripping means and its source of rotation, and means for indicating the resistance offered said expansible connections.

15. In a pipe laying machine, a carriage movably mountable on a laid pipe, ground engaging means movably connected to the carriage, driving means on the carriage to operate the ground engaging means to enable a new pipe to be alined with a connected pipe, and means to support a pipe from the carriage so that the same will partake of the carriage movements, and means to enable the carriage to be moved on the pipe.

16. In a pipe laying machine, a carriage, a motor on said carriage, standards slidably mounted on said carriage, means operable by the motor for moving the carriage vertically on the standards, means for locking the carriage in relation to the standards, means on the carriage for engaging and supporting a pipe to raise or lower it with the carriage, means for locking the carriage on a pipe, rotary pipe gripping means, and means operable by the motor for actuating said pipe gripping means.

17. In a pipe laying machine, a carriage, a motor on said carriage, standards slidably mounted on said carriage, means operable by the motor for moving the carriage vertically on the standards, means for locking the carriage in relation to the standards, means on the carriage for engaging and supporting a pipe to raise or lower it with the carriage, means for locking the carriage on a pipe, rotary pipe gripping means, means operable by the motor for actuating said pipe gripping means, and means for propelling the carriage on the pipe operated by the motor.

18. In a machine for laying pipes and the like horizontally, a carriage movably mountable on a laid pipe, ground engaging means connected to the carriage to support the latter, means whereby the carriage may be raised or lowered relative to the ground engaging means, means on the carriage to connect a second pipe to the first pipe, and means to actuate the carriage and therewith the ground engaging means to progressively move both from one pipe to another as same are connected so as to position the parts ready for connecting a new pipe to the last connected pipe.

19. In a pipe laying machine, a carriage movably mountable upon a laid pipe, driving means on the carriage, means actuated by the driving means to allow the forward end of the carriage to rock with the rear end of the carriage as a fulcrum, and means connected to the carriage and partaking of the movements thereof to support a pipe which is to be connected to the laid pipe so that by movement of the carriage the second named pipe will be alined with the laid pipe.

20. In a pipe laying machine, a tubular carriage for receiving a laid pipe and movable along the length thereof, means on the carriage to grip a second pipe which is to be secured to the laid pipe, and means to rotate said gripping means and thereby the second pipe from the carriage whereby to connect the pipes.

21. In a pipe laying machine, a tubular carriage for receiving a laid pipe, pipe screwing means on the carriage, means for driving the pipe screwing means, and means whereby the carriage may be rocked about the laid pipe as a fulcrum for bringing the second pipe into alinement with the laid pipe.

22. In a machine for connecting threaded pipes, pipe gripping means adapted for engagement with one of a pair of adjacent pipes to rotate same, and means adapted to be mounted on the other pipe and being connected to the gripping means for positively rotating the latter whereby to connect the pipes.

In testimony whereof we have hereunto set our hands in the presence of two subscribing witnesses.

JOHN J. MAHONEY.
WILLIAM L. NORRIS.

Witnesses:
  JOHN H. HERRING,
  W. W. HEALEY.